(12) United States Patent
Tsutsumi

(10) Patent No.: US 8,988,730 B2
(45) Date of Patent: Mar. 24, 2015

(54) IMAGE FORMING APPARATUS AND CONTROL METHOD THEREOF

(75) Inventor: Shuichi Tsutsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1225 days.

(21) Appl. No.: 12/613,365

(22) Filed: Nov. 5, 2009

(65) Prior Publication Data

US 2010/0118322 A1    May 13, 2010

(30) Foreign Application Priority Data

Nov. 11, 2008    (JP) .................................. 2008-289174

(51) Int. Cl.
| | |
|---|---|
| *G06F 15/00* | (2006.01) |
| *G06K 1/00* | (2006.01) |
| *H04N 1/00* | (2006.01) |
| *G06K 15/00* | (2006.01) |
| *H04N 1/405* | (2006.01) |
| *H04N 1/40* | (2006.01) |
| *H04N 1/60* | (2006.01) |

(52) U.S. Cl.
CPC ......... *H04N 1/6022* (2013.01); *G03G 2215/01* (2013.01)
USPC ............ 358/1.9; 358/518; 358/534; 358/504; 358/529; 358/3.01; 358/3.04; 358/3.22; 358/3.23; 347/9; 347/8; 347/6; 347/16; 399/28; 399/39; 399/74; 382/167; 382/254; 382/260

(58) Field of Classification Search
USPC ............. 358/3.02, 3.03, 3.04, 3.05, 3.09, 3.1, 358/3.22, 1.14, 1.18, 502, 504, 518, 520, 358/528, 1.9, 3.01, 3.06, 3.13, 3.14, 3.16, 358/3.18, 3.21, 3.23, 3.24, 3.26, 3.27, 501, 358/515, 519, 521, 525, 533, 534, 535, 536, 358/529; 347/6, 19, 115, 131, 172, 188, 73, 347/251, 254, 9, 8; 382/162, 167, 168, 169, 382/172, 260, 261, 262, 264, 270, 274, 276, 382/279, 282, 283, 254, 160, 53; 399/39, 399/41, 49, 53, 54, 58, 59, 60, 61, 28, 74; 708/420
See application file for complete search history.

(56) References Cited

U.S. PATENT DOCUMENTS

| | | | | |
|---|---|---|---|---|
| 6,215,561 | B1* | 4/2001 | Kakutani | ........................ 358/1.9 |
| 6,320,676 | B1* | 11/2001 | Yoshidome | ..................... 358/1.9 |
| 6,411,741 | B1* | 6/2002 | Hamamura et al. | ........... 382/254 |

(Continued)

FOREIGN PATENT DOCUMENTS

| | | |
|---|---|---|
| JP | 10-73978 | 3/1998 |
| JP | 2005-101934 | 4/2005 |

*Primary Examiner* — Fred Guillermety
*Assistant Examiner* — Jonathan R Beckley
(74) *Attorney, Agent, or Firm* — Fitzpatrick, Cella, Harper & Scinto

(57) ABSTRACT

When a recording agent amount limiting process is carried out, a color reproduction range is narrowed, and therefore gradation properties of dark areas are deteriorated and information originally held by an image is sometimes undesirably lost. By obtaining (401) a colorant amount for each target pixel of input color image data, calculating (402) a colorant amount of a peripheral area of the target pixel, and correcting (400) a density range of the input color image data based on the colorant amount of the target pixel and the colorant amount of the peripheral area of the target pixel, amounts of recording agent are limited and reductions in image quality are prevented.

9 Claims, 13 Drawing Sheets

(56) References Cited

U.S. PATENT DOCUMENTS

| | | | |
|---|---|---|---|
| 7,148,997 B2* | 12/2006 | Kawai et al. | 358/1.9 |
| 7,203,376 B2* | 4/2007 | Takahashi et al. | 382/252 |
| 7,324,244 B2* | 1/2008 | Yamamoto et al. | 358/462 |
| 7,327,503 B2* | 2/2008 | Yashima et al. | 358/504 |
| 7,460,158 B2* | 12/2008 | Otake et al. | 348/222.1 |
| 7,565,085 B2* | 7/2009 | Okuyama et al. | 399/27 |
| 7,581,798 B2* | 9/2009 | Arazaki | 347/12 |
| 7,616,360 B2* | 11/2009 | Otake et al. | 358/518 |
| 8,045,221 B2* | 10/2011 | Chiba | 358/1.9 |
| 2005/0068553 A1* | 3/2005 | Otake et al. | 358/1.9 |

* cited by examiner

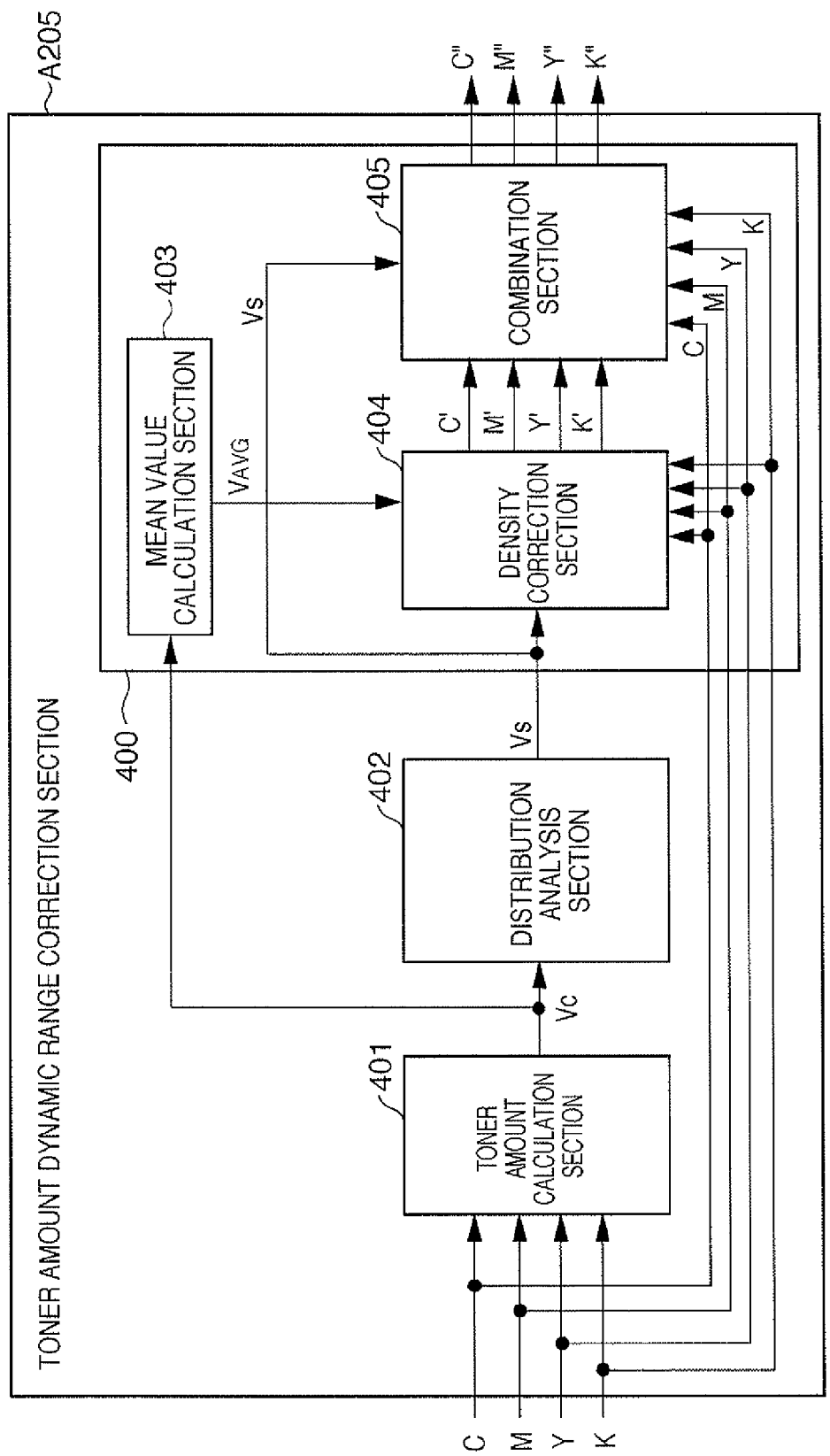

IMAGE FORMING APPARATUS AND CONTROL METHOD THEREOF

BACKGROUND OF THE INVENTION

1. Field of the Invention

The present invention relates to technologies for processing image data to be provided to image forming apparatuses such as electrophotographic or inkjet copiers and printers or the like, and particularly relates to image forming apparatuses and control methods thereof in which the amount of consumption of a recording agent such as toner or ink or the like is controlled.

2. Description of the Related Art

In image forming apparatuses that form images using an electrophotographic or inkjet method, the amounts of coloring material such as toner or ink are adjusted in response to image signals at the time of image formation. In these apparatuses it is common to provide a toner or ink consumption amount conserving mode that conserves running costs by reducing the consumption amounts of coloring material. Furthermore, in a case where image signals are input from an external source and an image is to be output, depending on characteristics of the image forming section of the printer, characteristics of the toner or ink, and the processing method for increasing the printing speed, sometimes a limit must be set on the consumption amount of toner or ink to be applied per unit of surface area. In such cases, a process is carried out of reducing the overall image signal levels to certain fixed limited values by matching the consumption amounts of toner or ink to the printing characteristics of the printer. As these processing methods, methods are known as described in Japanese Patent Laid-Open No. 2005-101934 for example in which the C, M, and Y image signal levels are reduced by a certain fixed ratio after under color removal. Furthermore, Japanese Patent Laid-Open No. 10-73978 describes a method in which the C, M, Y, and K image signal levels are reduced by a certain fixed ratio.

However, with the conventional method of limiting toner or ink amounts described in Japanese Patent Laid-Open No. 2005-101934, sometimes the gradation properties of dark areas are deteriorated and information that the image originally held is lost. This is caused by the range of color reproduction being narrowed due to reducing the image signal levels by the certain fixed ratio to limit the amounts of toner or ink.

SUMMARY OF THE INVENTION

The present invention has been devised in light of the above-described conventional examples and provides an image forming apparatus and a control method thereof in which the amounts of recording agent are limited by correcting pixel values based on a distribution of amounts of recording agent, thereby preventing reductions in image quality.

The present invention is configured as follows. Namely: an image forming apparatus, comprising: an obtainment unit configured to obtain a colorant amount for each target pixel of inputted color image data, a calculation unit configured to calculate a colorant amount of a peripheral area of the target pixel, and a correction unit configured to correct a density range of the input color image data based on the colorant amount of the target pixel and the colorant amount of the peripheral area of the target pixel.

With the present invention, the amounts of recording agent are limited by correcting pixel values based on a distribution of amounts of recording agent, thereby enabling reductions in image quality to be prevented.

Further features of the present invention will become apparent from the following description of exemplary embodiments with reference to the attached drawings.

BRIEF DESCRIPTION OF THE DRAWINGS

FIG. 4 is a schematic block diagram of a toner amount dynamic range correction section according to a first embodiment.

DESCRIPTION OF THE EMBODIMENTS

Hereinafter, preferred embodiments for executing the present invention are described using the accompanying drawings. The present embodiment assumes an electrophotographic color digital copier or the like as an image forming apparatus, but other printing devices such as electrophotographic or inkjet copiers or printers or the like may be considered equivalent. Furthermore, toner is assumed as the recording agent, but other recording agents (colorants) such as ink or the like may be considered equivalent.

First Embodiment

With the conventional methods of limiting an amount of colorant such as toner or ink, sometimes the gradation properties of dark areas are deteriorated and information that the image originally held is lost. Thus, as a pre-process of conventional toner amount limiting processing, description is given of a method in which a dynamic range of toner amounts is controlled in response to amounts that exceed a toner amount limit value for each pixel. By doing this, loss of image information due to the toner amount limiting process is reduced. Reducing the loss of image information leads to reducing deterioration in image quality. In the first embodiment, in particular a combination is carried out of a toner amount dynamic range corrected image and an input image based on information relating to a distribution of toner amounts. By doing this, effects on regions not targeted for toner amount reductions in the toner amount limiting process are prevented, and the foregoing issues are addressed. A configuration therefore will be described below. If it is given that density values represent toner amounts, then toner amount dynamic range correction is a process corresponding to density range compression.

Image Forming System

Figure 1:
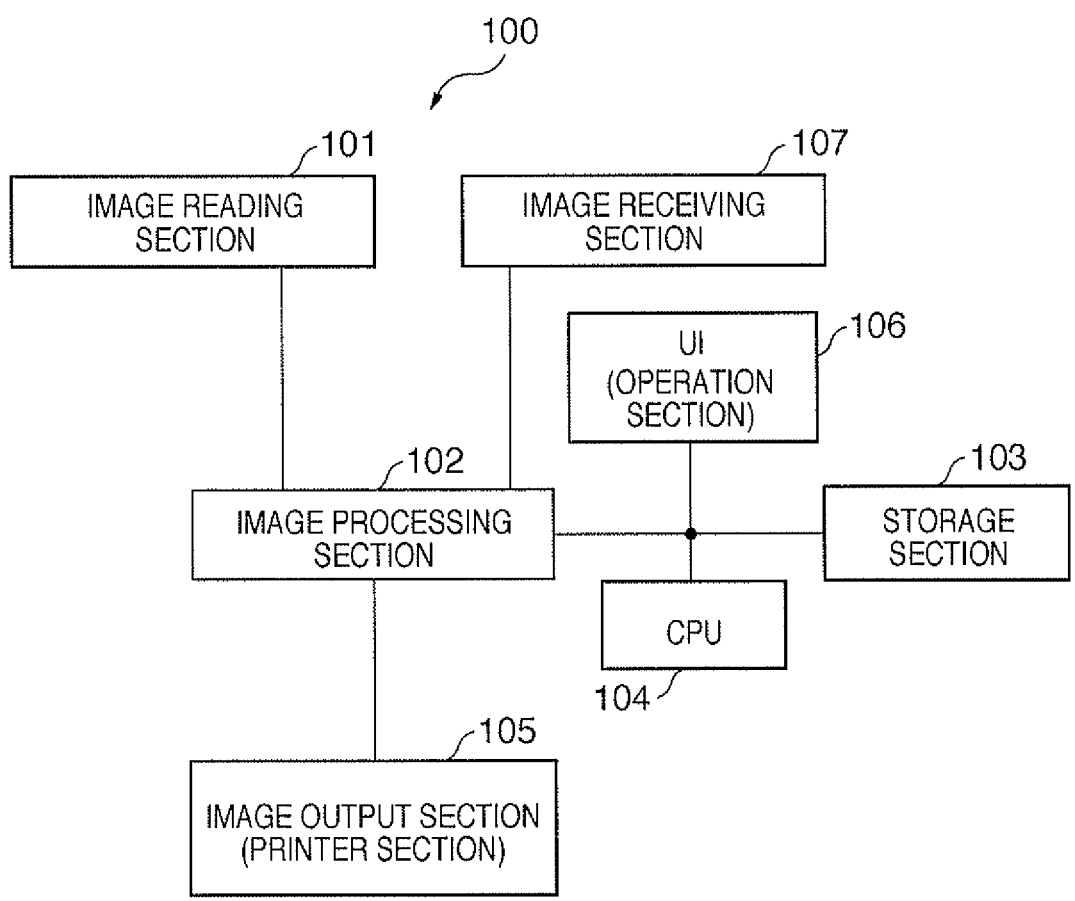
FIG. 1 is a block diagram that outlines an image forming apparatus according to an embodiment of the present invention.

FIG. 1 is a block diagram that outlines an image forming apparatus according to the present invention. First, description is given regarding a structure of the image forming apparatus according to the present embodiment. As shown in FIG. 1, an image forming apparatus 100 is provided with an image reading section 101, an image processing section 102, a storage section 103, a CPU 104, an image output section 105, a UI (user interface) 106, and an image receiving section 107. It should be noted that the image forming apparatus 100 is connectable to a server that manages image data via a network such as a LAN or the Internet, or to a personal computer (PC) that gives instructions to the image forming apparatus to execute printing.

Next, description is given regarding operation of each configuration in the image forming apparatus shown in FIG. 1. The image reading section 101 reads input images. For example, the image reading section 101 is an image scanner or the like, and converts an image that has been recorded on paper to digital image data. Digital image data that is output from the image reading section 101 is color image data constituted by CMYK color components for example. This is referred to as original color image data or original image data. The image receiving section 107 receives image data via a network or the like. Also, there are cases where print information described in a page description language is received. In the present embodiment, image data that has been read, image data that has been received, and print information that has been received are referred to collectively as print information or the like.

The image processing section 102 converts the image data that has been read or the print information or the like such as image data that has been received to intermediate information (hereinafter referred to as "objects") and stores these in an object buffer. At this time, image processing such as density correction or the like is carried out. Further still, the image processing section 102 generates bitmap data based on the objects and stores this in a band buffer. At this time, processes such as dithering and halftoning are carried out. The image processing section 102 may be constituted by a CPU and a memory, and a program executed by the CPU for achieving the above-mentioned functions. The object buffer and the band buffer may be provided in the storage section 103. The band buffer may also be provided locally in the image processing section 102. The bitmap data is constituted by pixels, and the pixels are constituted by density values of the individual color components. The density values can also be referred to as data of colorant amounts (colorant amount data) that expresses an amount of colorant such as toner.

Next, description is given regarding configurations and operations in storage section 103, the CPU 104, and the image output section 105 of the image forming apparatus shown in FIG. 1. The storage section 103 is constituted by various storage media such as a random access memory (RAM) and a read-only memory (ROM) and the like. For example, the RAM is used as a region for storing data and various types of information, and is used as a work region. On the other hand, the ROM is used as a region for storing various types of control programs. Furthermore, the CPU 104 is used as a component that executes and controls various types of processes in accordance with the programs stored in the ROM. Further still, the image output section 105 has an operation of outputting images (for example, outputting by forming an image on a recording medium such as a printing sheet or the like) based on bitmap data stored in the band buffer. In a case where the image output section is a color printer, images are formed by each of the color components of YMCK for example being overlaid on the medium, thereby enabling a full color image to be formed. In this case, bitmap data that is the basis of the image is generated for each of the color components of YMCK, and each of these sets of data are stored in the band buffer.

Figure 3A:
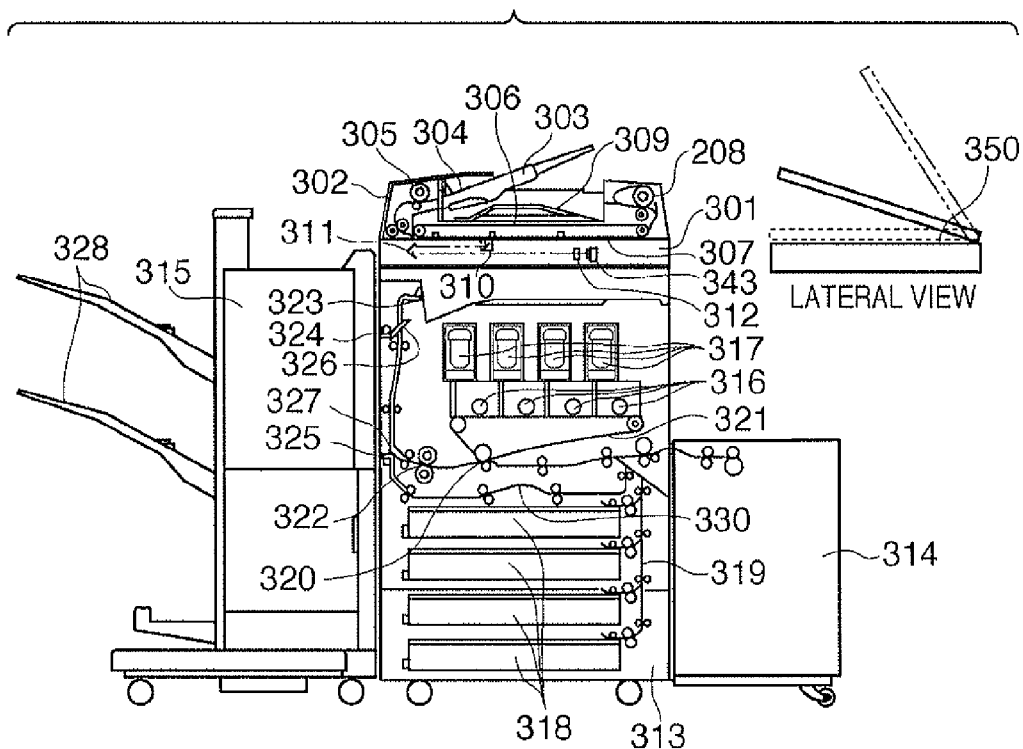
FIG. 3A and FIG. 3B are schematic diagrams of hardware configurations of an image reading section 101 and an image output section 105.
Figure 3B:
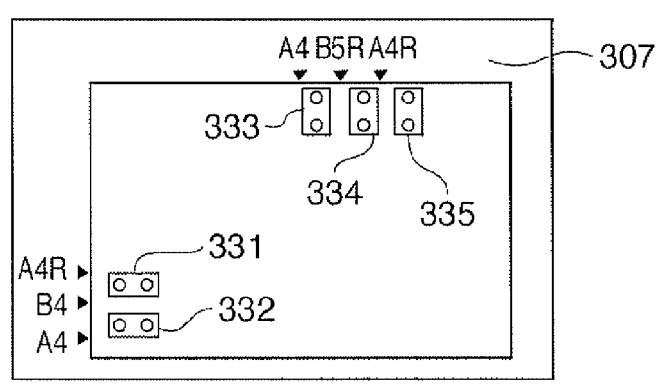

FIG. 3A is a cross-sectional view that schematically illustrates a hardware configuration of a digital multifunction peripheral, which is one example of an image forming apparatus having the image reading section 101, the image receiving section 102, and the image output section 106 of the image forming apparatus in FIG. 1. FIG. 3B is a top view of a platen. Description is given with reference to FIG. 3A and FIG. 3B regarding a more detailed configuration of the image forming apparatus described with reference to FIG. 1. This image forming apparatus is provided with the functions of copying, printing, and faxing. In FIG. 3A, the image forming apparatus according to the present embodiment is provided with components including a scanner 301, a document feeder (DF) 302, a printer 313 for print recording, which is provided with four color drums, a paper feed deck 314, and a finisher 315.

First, description is given regarding a reading operation, which is carried out centering on the scanner 301. In a case where an original is set on a platen 307 to carry out reading, a user sets the original on the platen 307 and closes the DF 302. Then, after an open/close sensor 350 detects that the platen 307 has been closed, light reflection type original size detection sensors 331 to 335 (see FIG. 3B) within the casing of the scanner 301 detect the size of the original that has been set. With this size detection as a starting point, a light source 310 irradiates the original, and a CCD (charge-coupled device) 343 receives the light reflected from the original via a reflection panel 311 and a lens 312, and an image is read. Then, a controller of the image forming apparatus converts the image data that has been read by the CCD 343 to digital signals, and desired image processing is carried out to convert these to laser recording signals. The recording signals that have been converted are stored in a memory inside the controller.

In a case where originals are set in the DF 302 to carry out reading, the user places originals face up in a tray of an original setting section 303 of the DF 302. Then, an original presence/absence sensor 304 detects that originals have been set, and upon such detection an original feeding roller 305 and a transport belt 306 rotate to transport an original, and the original is set in a predetermined position over the platen 307. From here onward an image is read in the same manner as reading with the platen 307, and the obtained recording signals are stored in the memory inside the controller.

When reading is completed, the transport belt 306 rotates again to feed the original to a right side in the cross-sectional view of the image forming apparatus in FIG. 3A, and then the original is discharged to an original discharge tray 309 by way of a discharge-side transport roller 308. In a case where there are multiple originals, at the same time as the original is discharged and transported from the platen 307 to the right side in the cross-sectional view of the image forming apparatus, a next original is fed from the left side in the cross-sectional view of the image forming apparatus by way of the feeding roller 305, and reading of the next original is carried out in a continuous manner. The foregoing is an operation of the scanner 301.

Next, description is given regarding a printing operation, which is carried out centering on the printer 313. The recording signals (print image data) that have been temporarily stored in the memory of the controller are transferred to the printer 313 and are converted to recording laser lights of four colors of yellow, magenta, cyan, and black by a laser recording section thereof. Then, the recording laser lights are irradiated onto a photosensitive member 316 of each color and an electrostatic latent image is formed on each of the photosensitive members. Then the printer 313 carries out toner development on each of the photosensitive members using toner supplied from toner cartridges 317, and the toner images that have been made visible on the photosensitive members undergo primary transfer to an intermediate transfer belt 321. The intermediate transfer belt 321 rotates in a clockwise rotational direction in FIG. 3A such that the toner images are transferred from the intermediate transfer belt 321 to a recording paper when the recording paper, which has been fed from a paper cassette 318 or the paper feed deck 314 via a feeding transport path 319, has arrived at a secondary transfer position 320.

On the recording paper on which an image has been transferred, the toner is fixed by a fixing unit 322 using pressure and heat, and then the recording paper is transported on a discharge transport path. Then the recording paper is discharged face-down to a center tray 323, or is switched back to a discharge outlet 324 to the finisher, or is discharged face up to a side tray 325. However, the side tray 325 is a discharge outlet capable of discharge only in a case where the finisher 315 is not installed. Flappers 326 and 327 are components for switching the transport paths for switching between these discharge outlets. In a case of double-sided printing, the flapper 327 switches the transport path after the recording paper has passed through the fixing unit 322, after which the recording paper is switched back and sent downward to be fed again to the secondary transfer position 320 via a double-sided printing transport path 330 for double-sided printing to be carried out.

Next, description is given regarding operations carried out by the finisher 315. The finisher 315 applies post-processing to papers that have been printed in response to functions indicated by the user. Specifically, it has functions including stapling (stitching in one location, two locations), punching (two holes, three holes), and binding saddle stitching or the like. The image forming apparatus in FIG. 3A has two discharge trays 328, and the recording papers that pass through the discharge outlet 324 to the finisher 315 are sorted, for example, into the discharge trays 328 for each function of copying, printing, and faxing according to user settings. The printer 313 is a printer having four color drums, but it may also be an engine having a single color drum. When being used as a printer, various settings are made possible for the image forming apparatus in FIG. 3A by a driver, these settings including black and white printing and color printing, paper size, 2-up/4-up/n-up printing, double-sided printing, stapling, punching, binding saddle stitching, interleafing, cover sheets, and back covers.

Toner Amount Limiting Process

Figure 2:
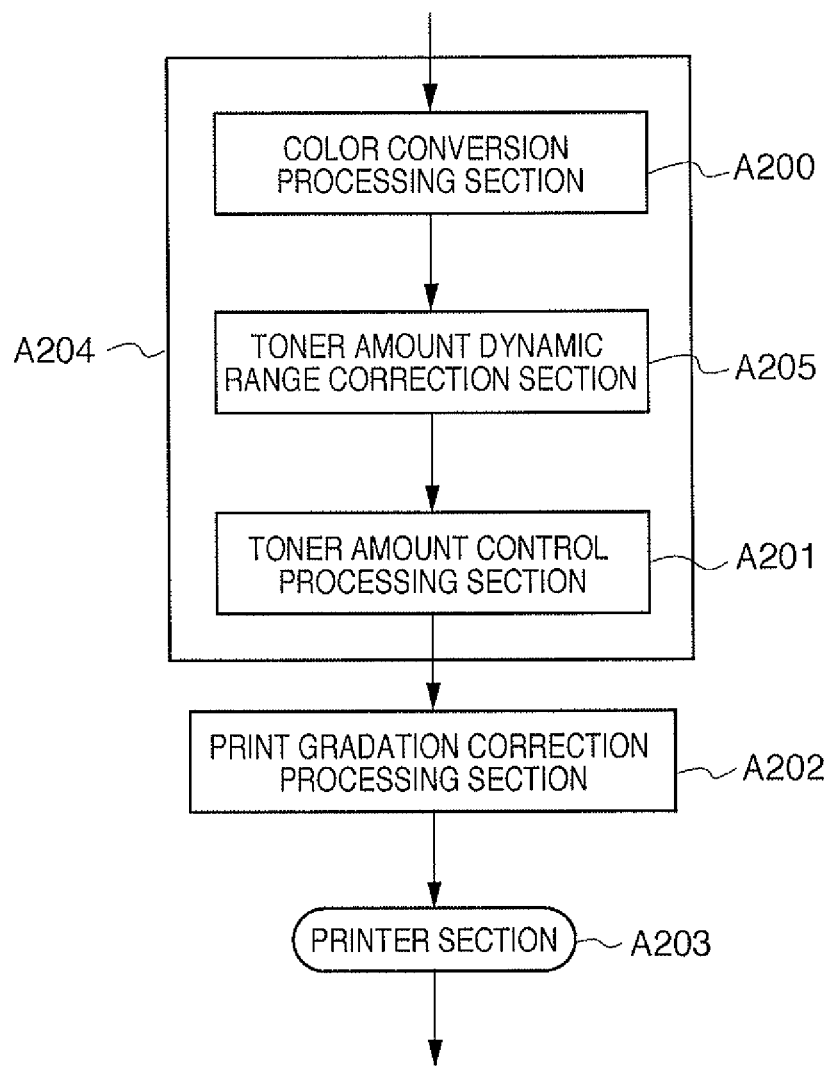
FIG. 2 is a block diagram that outlines image formation.

Next, description is given regarding a specific process in which toner amounts are limited. First, a block diagram relating to toner amount limiting is shown in FIG. 2. It should be noted that "printer section" in FIG. 2 corresponds to the image output section 105. Furthermore, blocks other than the "printer section" indicate functions carried out by the image processing section 102. Although there are cases where the functions of the image processing section 102 are implemented by hardware, the functions may be achieved by a program of the illustrated procedure. Here, description is given assuming implementation as hardware units. After bitmap data has been generated based on print information or the like, the processing of FIG. 2 is executed on that bitmap data.

FIG. 2 is a schematic diagram showing a portion of processing in the image processing section 102 and processing in the image output section 105. A unit A200 in the image processing section 102 is a color conversion processing section that carries out a color conversion process from a first color system, an RGB color system for example, of an input system to a second color system, a CMYK color system for example, of an output system. A unit A205 is a toner amount dynamic range correction processing section. Details of these processes are described later. A unit A201 is a toner amount control processing section, which carries out reductions of the toner amounts when the toner amounts are greater than a limit value. Reductions of toner amounts are achieved by processing the image data. A unit A202 is a print gradation correction processing section, which carries out gamma conversions and time-change corrections for correcting change in the output densities of the printer over time. A unit A204 corresponds to the image processing section 102, which carries out various types of image processing of the unit A200, unit A205, and the unit A201 and the like. A unit A203 is a printer section that performs output based on image processing results, and corresponds to the image output section 105.

Various methods can be employed in regard to the toner amount control processing section A201 in FIG. 2. For example, a method in which the image signal levels of C, M, Y, and K are reduced by a fixed ratio, which is described in Japanese Patent Laid-Open No. 10-73978, or a method in which the image signal levels of C, M, and Y, are reduced by a fixed ratio after under color removal, which is described in Japanese Patent Laid-Open No. 2005-101934, can be employed.

It should be noted that since gamma processing is a process for linearly converting the input/output characteristics of the printer, it is preferable that this is carried out after color processing. Further still, since there is a possibility with toner amount limiting processes for color components to be lost irreversibly, it is preferable that color processing such as density adjustments and the like are carried out after the toner amount limiting process.

Toner Amount Dynamic Range Correction Processing

Figure 10:
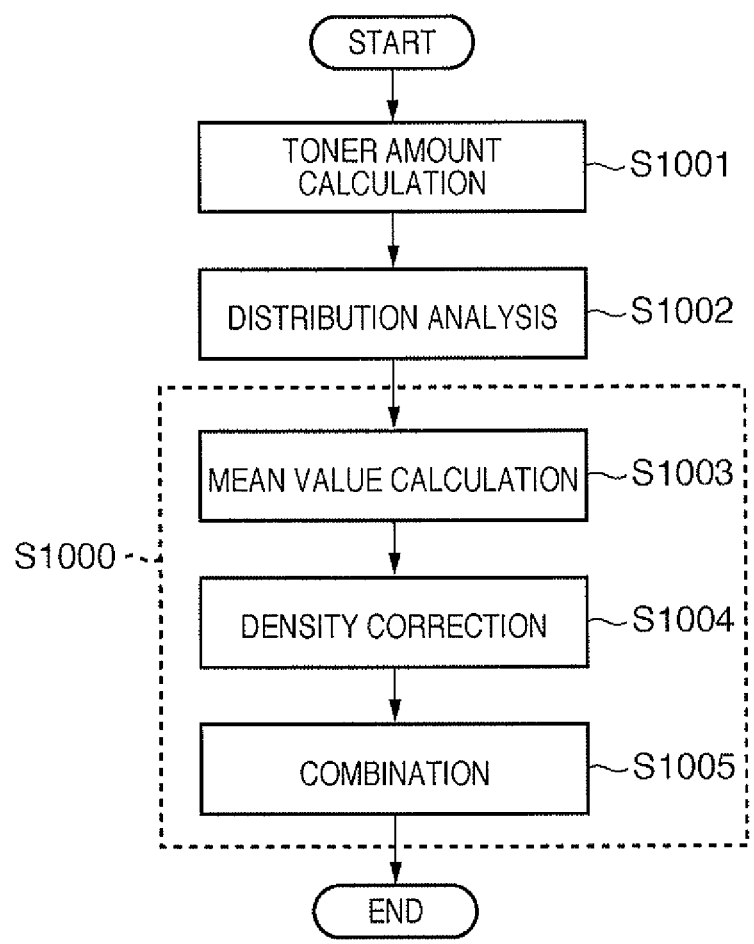
FIG. 10 is a flowchart pertaining to the first embodiment.

FIG. 4 shows a block diagram of the toner amount dynamic range correction section A205 according to the present invention, and FIG. 10 shows a flowchart of processing in the toner amount dynamic range correction section A205. Although there are cases where the functions of the toner amount dynamic range correction section A205 are implemented by hardware, the functions may be achieved by a program.

In FIG. 4, a conversion section 400 includes a mean value calculation section 403, a density correction section 404, and a combination section 405. Step S1000 in FIG. 10 corresponds to processing in the conversion section 400 and includes a mean value calculation step S1003, a density correction step S1004, and a combination step S1005. Hereinafter, description is given with reference to FIG. 4 and FIG. 10 regarding operations of the toner amount dynamic range correction section A205 according to the first embodiment. Color bitmap pixel data, which has undergone a color conversion process to a CMYK color system, is inputted to the toner amount dynamic range correction section A205.

First, in step S1001, a toner amount $Vc(x,y)$ of a pixel $(x,y)$ is calculated from CMYK input signals by a toner amount calculation section 401. It should be noted that $(x,y)$ is a value that indicates a position of a pixel in bitmap image data in a two-dimensional coordinate system. In step S1001, for example, values in which values of each of input signals C(x,y), M(x,y), Y(x,y), and K(x,y) of a pixel (x,y) are totaled are set as the toner amount Vc(x,y) of the pixel (x,y). Furthermore, values in which values C(x,y)+K(x,y), M(x,y)+K(x,y), and Y(x,y)+K(x,y) are totaled, in which the value of K is added to the values of the colors C, M, and Y respectively, may be set as the toner amount Vc(x,y) of the pixel (x,y).

Next, in step S1002, a filtering process is carried out on the toner amounts Vc(x,y) by a distribution analysis section 402, and peripheral toner amounts Vs(x,y) are calculated. Available filtering processes here include a method in which convolution is carried out using a Gaussian filter on peripheral pixels including a pixel of interest (x,y) (to be referred to as a target pixel) and a method in which convolution is carried out using bilateral filtering. Furthermore, to increase the speed of convolution, the filtering process may be carried out after carrying out down sampling to enable a small filter size to have a relatively large filter size.

Hereinafter, description is given regarding a method in which convolution is carried out using a Gaussian filter on peripheral pixels including a pixel of interest. The peripheral toner amounts Vs(x,y) for a pixel of interest (x,y) are expressed by the following expression:

$$Vs(x,y)=Vc(x,y)*G(x,y)$$

Here, an operator * expresses convolution. G(x,y) is a Gaussian function expressed by the following expression:

$$G=K\exp\{-(x^2+y^2)/\sigma^2\}$$

$$\iint G(x,y)dxdy=1$$

Here, K expresses a level of the Gaussian function and σ expresses a standard deviation of the Gaussian function. That is, the peripheral toner amounts Vs(x,y) of a pixel (x,y) are obtained by carrying out a smoothing process in which a given Gaussian filter G is used on image data constituted as peripheral toner amounts Vs(x,y) of the pixel (x,y). For example, as the Gaussian filter G it is possible to use an n×n coefficient matrix in which a sum total of element coefficients is 1 and a distribution thereof conforms to a Gaussian distribution. By using this coefficient matrix to carry out product-sum calculations for each color component of the image data, the peripheral toner amounts Vs(x,y) of the pixel (x,y) are obtained. That is, a peripheral toner amount is a toner amount for forming a pixel of interest including toner amounts lost by dispersion from the pixel of interest and toner amounts that disperse from the peripheral pixels to reach the pixel of interest in a case where the toner that forms a certain pixel disperses to peripheral pixels in accordance with a Gaussian distribution. Here, a range of neighborhood pixels is defined by the filter size, and for an n×n filter, n×n pixels centering on the pixel of interest are the neighborhood pixels.

In step S1003, a mean value $V_{AVG}$ of toner amounts of the overall image is calculated from CMYK input signals by the mean value calculation section 403. For example, toner amounts Vc(x,y) of pixels (x,y) are added up for all the pixels and this is divided by the number of pixels, thereby giving a mean value $V_{AVG}$ of toner amounts. Step S1003 may be carried out before step S1002.

In step S1004, the density correction section 404 uses the peripheral toner amounts Vs(x,y) of the pixel (x,y) and the mean value $V_{AVG}$ of toner amounts per pixel in the overall image to correct the color signal values of each pixel of the CMYK input signals. Signal values C'(x,y), M'(x,y), Y'(x,y), and K'(x,y) in the corrected pixels (x,y) are obtained by multiplying the signal values C(x,y), M(x,y), Y(x,y), and K(x,y) by $V_{AVG}/Vs(x,y)$ respectively. That is, when a color component of an input pixel is given as I (I may be any of CMYK), a corrected color component I' is expressed as I'(x,y)=I(x,y)× $V_{AVG}/Vs(x,y)$. Furthermore, a fixed value may be used instead of $V_{AVG}$.

It should be noted that here it is possible to carry out a clipping process without multiplying by $V_{AVG}$. A clipping process is a process of clipping pixel values of approximately 3% at the top and bottom of a histogram distribution then allotting digital values in accordance with an output bit number (for example, 8 bits) using linear conversion. In a case where a clipping process is carried out, the mean value calculation section 403 in FIG. 4 is eliminated, and a clipping processing section is inserted between the density correction section 404 and the combination section 405.

Figure 5:
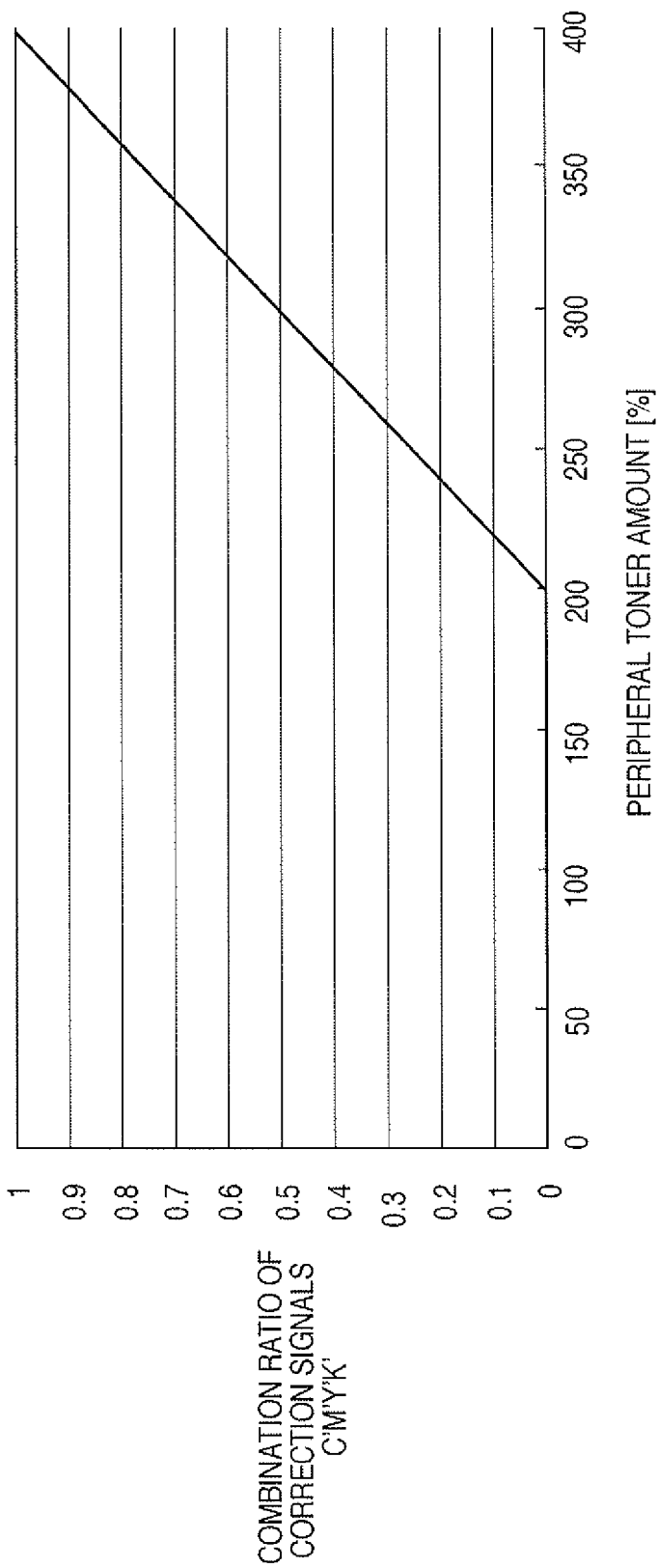
FIG. 5 is a diagram showing an example of a conversion table from toner amounts to correction image (C'M'Y'K' in FIG. 4) combination ratios.

In step S1005, a combination ratio r of the CMYK input signals of the pixels (x,y) and the corrected C'M'Y'K' signals is determined by the combination section 405 based on the peripheral toner amounts Vs(x,y) of the pixels (x,y), and combination is carried out based on the combination ratio r that is determined. The determining of the combination ratio r is carried out for example using a table or function held in advance in the combination processing section. An example of a table is shown in FIG. 5. This table signifies that, in a case where the toner amount limit value is 200%, correction is not carried out in regard to pixels of the toner amount limit value or less, and for portions above the toner amount limit value, the proportion of corrected image is greater for portions having greater of toner amounts. The combination ratio r(x,y) of correction signals can be obtained from the table for peripheral toner amounts Vs(x,y) of the pixels(x,y). Combination-processed signal values C"(x,y), M"(x,y), Y"(x,y), and K"(x,y) are obtained by combining the color component values of the input pixel values before and after correction using the combination ratio r. That is, when a combined color component is given as I" (I may be any of CMYK), this is expressed as I"(x,y)=I(x,y)×{1−r(x,y)}+I'(x,y)×r(x,y).

The C"M"Y"K" signals, which are the output of the combination section 405, become the output of the toner amount dynamic range correction section A205 according to the present embodiment.

In this manner, first compression is carried out on the density range in the density correction section 404 of the dynamic range correction section A205 prior to the toner amount (colorant amount) limiting process. With this correction process, the values of color components of the pixel of interest are corrected so that the values of color components of the pixel of interest become smaller for larger data of toner amounts in peripheral areas of the pixel of interest. The data of toner amounts in peripheral areas of the pixel of interest is a value obtained by taking into account the amounts of toner of neighborhood pixels in addition to the amount of toner of the pixel of interest. That is, it is a weighted average of toner amounts of neighborhood pixel groups centered on the pixel of interest, and the weighting thereof is in accordance with a Gaussian distribution.

Density-corrected color component values are values in which a ratio of toner amount mean values to peripheral toner amounts of a pixel of interest is multiplied by the color components of the pixel of interest. That is, the density corrected color component values are corrected so that, if the peripheral toner amounts are smaller than the toner amount mean value, the pixel value becomes larger than the original value, and if the peripheral toner amounts are larger than the toner amount mean value, the pixel value becomes smaller than the original value. Accordingly, for pixels whose peripheral toner amount of the pixel of interest exceeds a threshold value and whose peripheral toner amount is larger than that toner amount mean value, correction is performed so that the color component values of those pixels become smaller. Furthermore, for pixels whose peripheral toner amount of the pixel of interest exceeds a threshold value and whose peripheral toner amount is smaller than that toner amount mean value, correction is performed so that the color component values of those pixels become larger.

Furthermore, pixel values are combined in the combination section 405 so that when the peripheral toner amount of the pixel of interest, namely, the toner amount of the pixel of interest after smoothing processing, exceeds a predetermined threshold value, the proportion of the density-corrected color component values is increased with the exceeding amount thereof becoming larger, and conversely the proportion of input color component values is reduced. It should be noted that correction is not carried out on color component values in regard to pixels whose peripheral toner amounts do not exceed the threshold value, and the signals output from the color conversion processing section A200 are output as output signals of the toner amount dynamic range correction section A205.

After this, a toner amount control process is carried out by the toner amount control processing section A201. Although it is possible to compress the dynamic range of toner amounts (densities) in the dynamic range correction process A205, there are cases where the sum total of toner is not lower than an allowed value, and therefore it is necessary to carry out the toner amount control process A201 after the toner amount dynamic range correction process A205. The toner amount control process itself may be equivalent to a conventional process. For example, a method described in Japanese Patent Laid-Open No. 10-73978 may be employed in which the C, M, Y, and K image signal levels are reduced by a certain fixed ratio. Furthermore, toner amounts may be controlled using a method described in Japanese Patent Laid-Open No. 2005-101934 in which the C, M, and Y image signal levels are reduced by a certain fixed ratio after under color removal.

Figure 13:
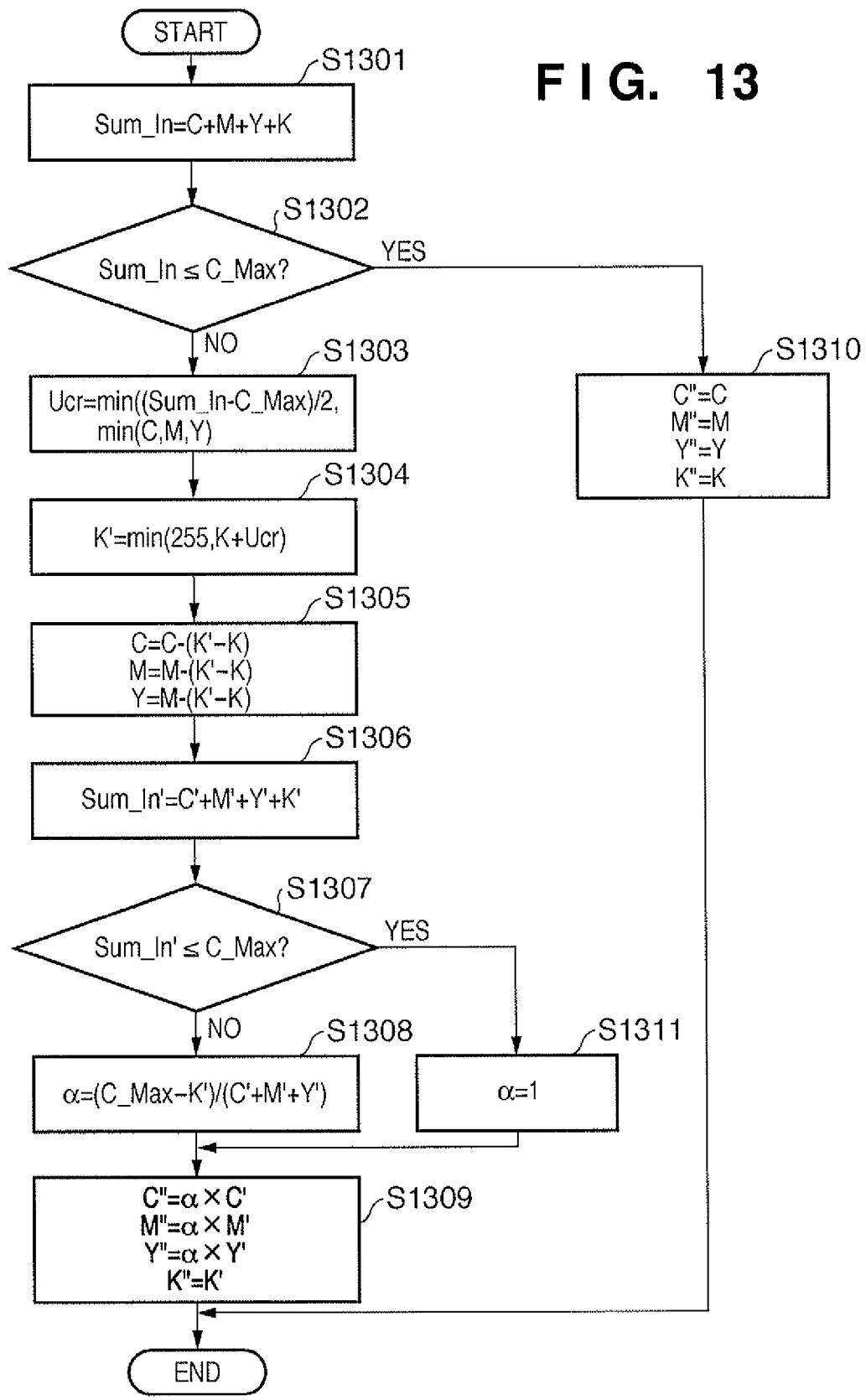
FIG. 13 is a flowchart of a toner limiting process.

FIG. 13 shows one example of a processing procedure of a toner amount limiting process. This process also is executed on each pixel by the image processing section 102 (specifically, the toner amount limiting processing section A201). The input data is C"M"Y"K" signals obtained in the processing of FIG. 10. However, in FIG. 13, description is given by temporarily replacing C"M"Y"K" with CMYK. In other words, CMYK in FIG. 13 corresponds to C"M"Y"K" in FIG. 10.

First, a sum total Sum_In of all CMYK color components (this is considered to be a sum total of toner amounts) is calculated (S1301). Next, the sum total Sum_In is compared with a toner allowed value C_Max (S1302). If the sum total Sum_In is not greater than the allowed value C_Max, then the CMYK input values are output as they are as C"M"Y"K" output values (S1310).

On the other hand, if the sum total Sum_In exceeds the allowed value C_Max, then half the exceeding amount thereof, namely (Sum_In−C_Max)/2, and a smallest value of each value of the input C, M, and Y are used as values Ucr for under color removal (S1303). However, since under color removal is not feasible when the post-UCR K component (K') exceeds 255, if K+Ucr exceeds 255, then the post-UCR K' is set to the smaller value from among K+Ucr and 255 (S1304). The color component (K'−K) removed by UCR is subtracted from the color components CMY to give post-UCR values of C', M', and Y' (S1305).

Next, a sum total of C'M'Y'K' of post-UCR color components (this is considered to be a sum total of toner amounts) Sum_In' is calculated (S1306). Then, Sum_In' is compared with the allowed value C_Max of amounts of toner to be applied (S1307), and if this is within the allowed value, a toner amount control coefficient α is set to 1 (S1311). On the other hand, if Sum_In' exceeds the allowed value C_Max, then the toner amount control coefficient α to be multiplied by the CMY component values is determined so that the sum total of the color components becomes the allowed value. That is, a coefficient α is obtained in which αC'+αM'+αY'+K'=C_Max (S1308). Finally, values in which C', M', and Y' are multiplied by the coefficient α obtained in step S1308 or S1311 are set as output values C", M", and Y", and for the black color component, K' is set as it is as the output value K" (S1309). In this manner, the sum total of toner amounts per pixel can be suppressed to the allowed value C_Max.

CMYK (or CMY) bitmap data obtained in this manner is output by the image output section 105 as a visualized image on paper or the like as a permanent image. At that time, recording agents of CMYK or CMY color components are used in response to the CMYK or CMY values for which the toner amount limiting process has been executed, and therefore the toner amounts to be used in image forming are suppressed to amounts in accordance with the limits. Furthermore, since density range compression processing is carried out corresponding to toner amounts before the toner limiting process, image information loss due to toner amount limiting can be reduced without affecting areas not targeted for toner amount reductions by toner amount limiting. In particular, it is possible to prevent shadow-detail loss caused by saturation of high density areas due to toner amount control processing.

Effect of the Present Embodiment

By carrying out processing according to the present embodiment as preprocessing of toner amount limiting, image information loss due to toner amount limiting can be reduced without affecting areas not targeted for toner amount reductions by toner amount limiting.

Second Embodiment

In a second embodiment, description is given regarding a method in which in the toner amount dynamic range correction processing, a ratio of peripheral toner amounts for each pixel and the toner amount mean value of the overall image is controlled in response to an amount the toner amount limit value is exceeded, thereby adjusting a correction intensity of dynamic range corrections. In this way, it is possible to prevent affecting the toner amount reductions in the toner amount limiting process while reducing image information loss due to toner amount limiting.

It should be noted that in the image forming apparatus of the present embodiment, same numbers are assigned to same configurations as the foregoing first embodiment, and description thereof is omitted.

Toner Amount Dynamic Range Correction Processing

Figure 6:
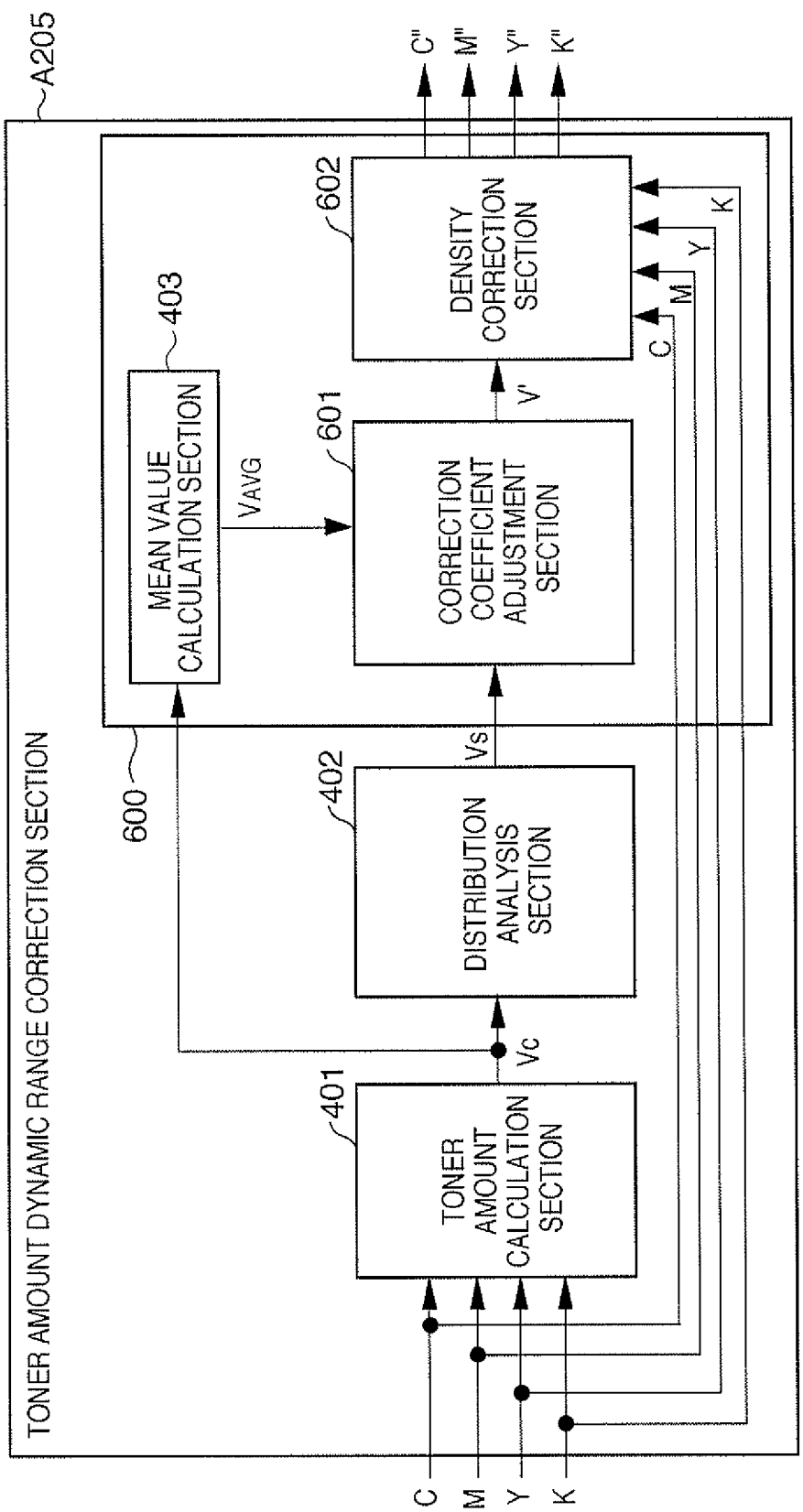
FIG. 6 is a schematic block diagram of a toner amount dynamic range correction section according to a second embodiment.
Figure 11:
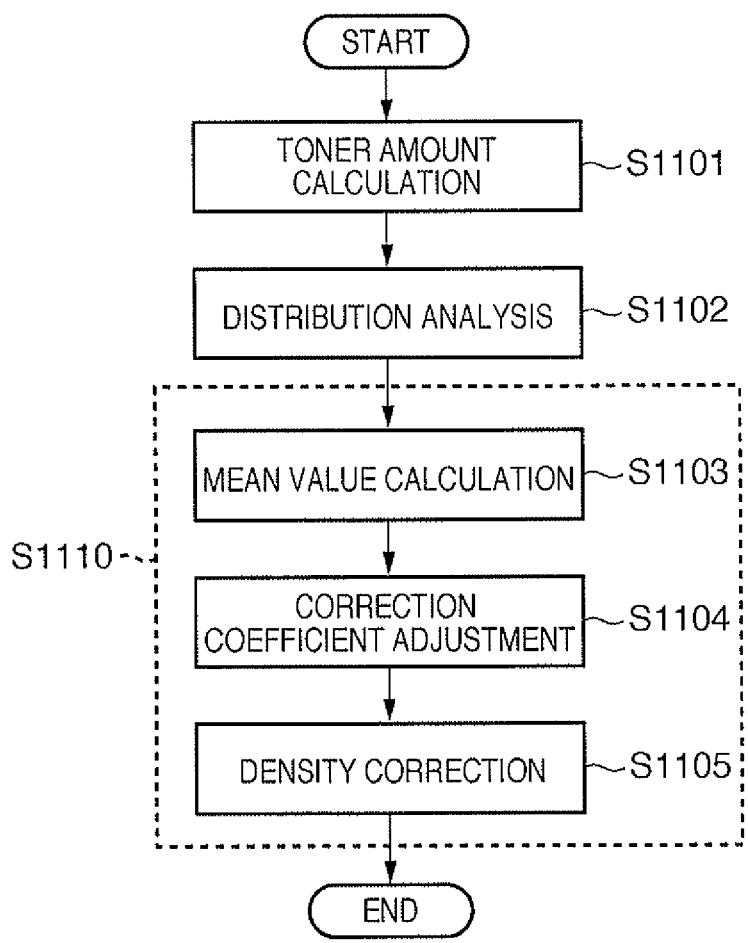
FIG. 11 is a flowchart pertaining to the second embodiment.

FIG. 6 shows a block diagram of the toner amount dynamic range correction section according to the present embodiment, and FIG. 11 shows a flowchart of processing in the toner amount dynamic range correction processing section. It should be noted that "toner amount dynamic range correction section" in FIG. 6 corresponds to the unit A205. Although there are cases where the functions of the toner amount dynamic range correction section are implemented by hardware, the functions may be achieved by a program. A conversion section 600 includes the mean value calculation section 403, a correction coefficient adjustment section 601, and a density correction section 602. Similarly, step S1100 includes step S1103, S1104, and S1105. Hereinafter, description is given with reference to FIG. 6 and FIG. 11 regarding operations of a toner amount dynamic range correction section according to the second embodiment.

Operations of the toner amount calculation section 401 in step S1101, operations of the distribution analysis section 402 in step S1102, and operations of the mean value calculation section 403 in step S1103 have an equivalent processing content as the first embodiment, and therefore description thereof is omitted. That is, these correspond to steps S1001, S1002, and S1003 respectively in FIG. 10.

In step S1104, in the correction coefficient adjustment section 601, the peripheral toner amounts Vs(x,y) of the pixel (x,y) and the mean value $V_{AVG}$ of toner amounts in the overall image are used to calculate a density correction coefficient V(x,y). The density correction coefficient V(x,y) is expressed by the following expression using the peripheral toner amounts Vs(x,y) and the mean value of toner amounts.

$$V(x,y) = V_{AVG}/Vs(x,y)$$

Further still, in the present embodiment, an adjusted value V'(x,y) based on the peripheral toner amounts Vs(x,y) of each pixel is used as a density correction coefficient. In adjusting V(x,y), $V_{AVG}$, which is a denominator may be adjusted, or Vs(x,y), which is a numerator, may be adjusted. In a case of adjusting the denominator, the adjusted density correction coefficient V'(x,y) is expressed as in the following expression using an adjustment coefficient a(x,y) determined for each pixel.

$$V'(x,y) = V_{AVG}/\{(Vs(x,y) - V_{AVG}) \times a(x,y) + V_{AVG}\}$$

Figure 7:
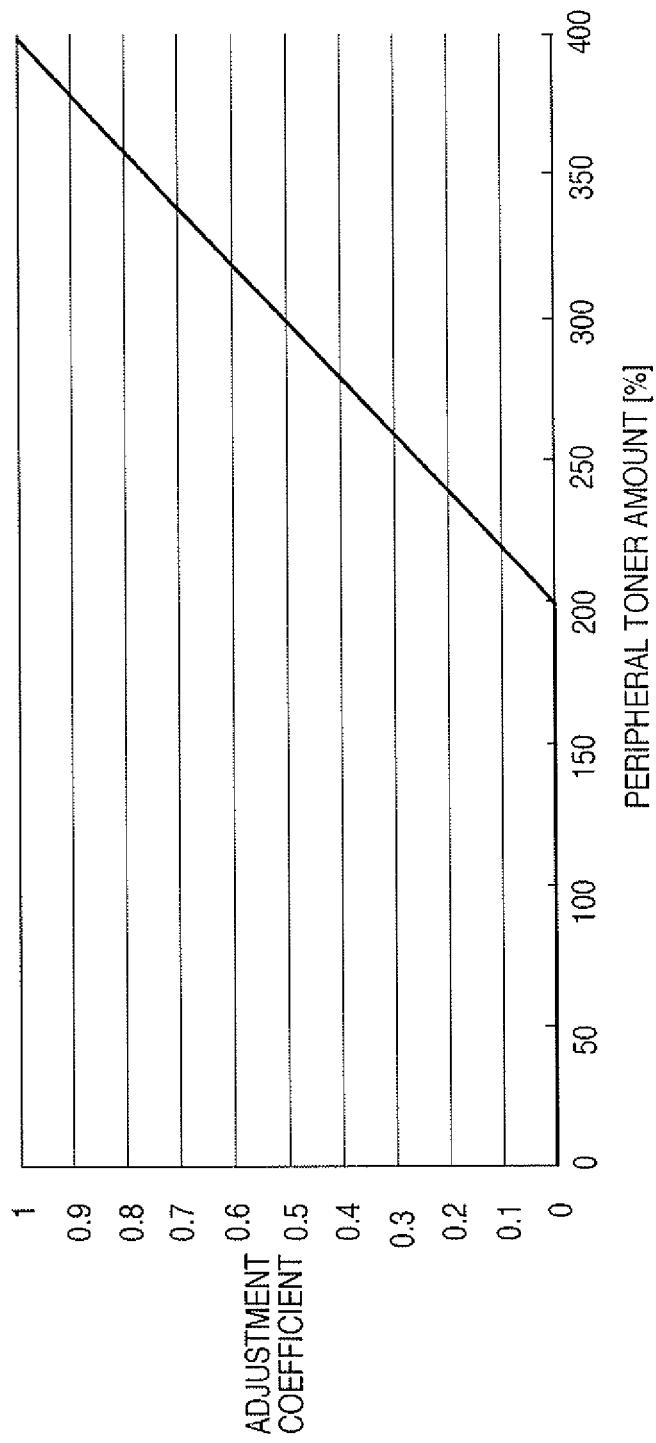
FIG. 7 is a diagram showing an example of a conversion table from toner amounts to adjustment coefficients.

The value V' is 1 when the adjustment coefficient a=0, that is, the input value is output as it is, and becomes V when a=1. An example of a table for determining a(x,y) is shown in FIG. 7. The table in FIG. 7 signifies that, in a case where the toner amount limit value is 200%, correction is not carried out (that is, a=0) in regard to pixels of the toner amount limit value or less, and for portions above the toner amount limit value, the correction intensity is increased for portions having greater toner amounts. In this way, the correction amounts are larger for larger peripheral toner amounts.

On the other hand, in a case of adjusting the numerator, it is expressed as in the following expression using an adjustment coefficient b(x,y) determined for each pixel.

$$V'(x,y) = \{(Vs(x,y) - V_{AVG}) \times b(x,y) + V_{AVG}\}/Vs(x,y)$$

In this case, the value V' is 1 when the adjustment coefficient b=1, that is, the input value is output as it is, and becomes V when b=0. A table for determining the adjustment coefficient b becomes a table in which 0 and 1 are substituted in the value range in FIG. 7. Thus, the correction amounts are larger for larger peripheral toner amounts.

In this way, the density correction coefficient V is determined according to a ratio of the toner amount mean value to the peripheral toner amount of the pixel of interest, and a further enhanced density range compression effect can be obtained in regard to pixels having larger peripheral toner amounts using the adjustment coefficient.

A difference between a(x,y) and b(x,y) is that the intensity of the toner amount dynamic range correction effects is increased for larger values of a(x,y), and conversely the intensity of the toner amount dynamic range correction effects is increased for smaller values of b(x,y). Determining the adjustment coefficients a(x,y) and b(x,y) is carried out based on the peripheral toner amounts Vs(x,y) using a table or function for example that is held in advance.

In step S1105, the density correction section 602 uses the corrected toner amount coefficient V'(x,y) to correct the color signal values of each pixel of the CMYK input signals. Specifically, signal values C'(x,y), M'(x,y), Y'(x,y), and K'(x,y) in the corrected pixels (x,y) are obtained by multiplying the input values by the toner amount coefficient V'(x,y). For example, a corrected value I'(x,y) of the color component I(x,y) is expressed as I'(x,y)=I(x,y)×V'(x,y). Here, I is any of CMYK.

The C'M'Y'K' signals, which are the output of the density correction section 602, become the output C"M"Y"K" of the toner amount dynamic range correction section according to the present embodiment. The toner amount limiting process is as shown in FIG. 13.

In this way, with the correction processing of the present embodiment, if colorant amount data of peripheral areas of a pixel of interest in original color image data exceeds a threshold value, the values of the color components of the pixel of interest are corrected by performing compression using a higher compression ratio for larger colorant amount data of peripheral areas of that pixel.

As described above, correction is performed so that the dynamic range of the image is compressed before the toner amount control process, and therefore it is possible to prevent shadow-detail loss caused by saturation of high density areas due to toner amount control processing.

Effect of the Present Embodiment

By carrying out processing according to the present embodiment as preprocessing of toner amount limiting, image information loss due to toner amount limiting can be reduced without affecting areas not targeted for toner amount reductions.

Third Embodiment

An intensity of the dynamic range correction effect varies depending on image characteristics, and therefore there are cases where, depending on the image, a more natural toner amount limited image can be obtained by weakening or strengthening the overall correction effect. Accordingly, in a third embodiment, description is given regarding a method for dynamically generating a table for determining the combination ratio based on information relating to the toner amount when determining the combination ratio according to the first embodiment.

It should be noted that in the image forming apparatus of the present embodiment, the same numbers are assigned to the same configurations as the foregoing first embodiment, and description thereof is omitted.

Toner Amount Dynamic Range Correction Processing

Figure 8:
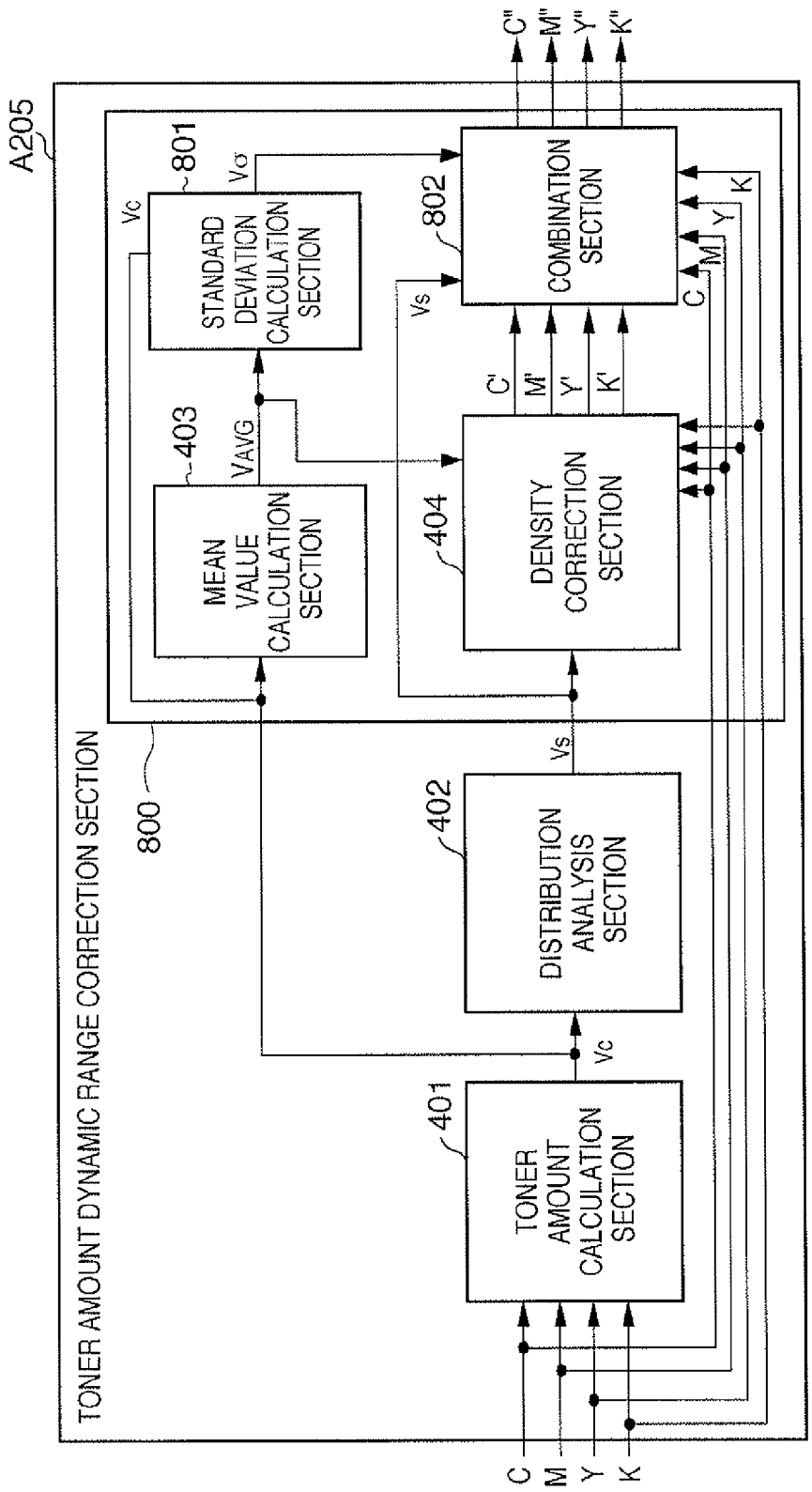
FIG. 8 is a schematic block diagram of a toner amount dynamic range correction section according to a third embodiment.
Figure 12:
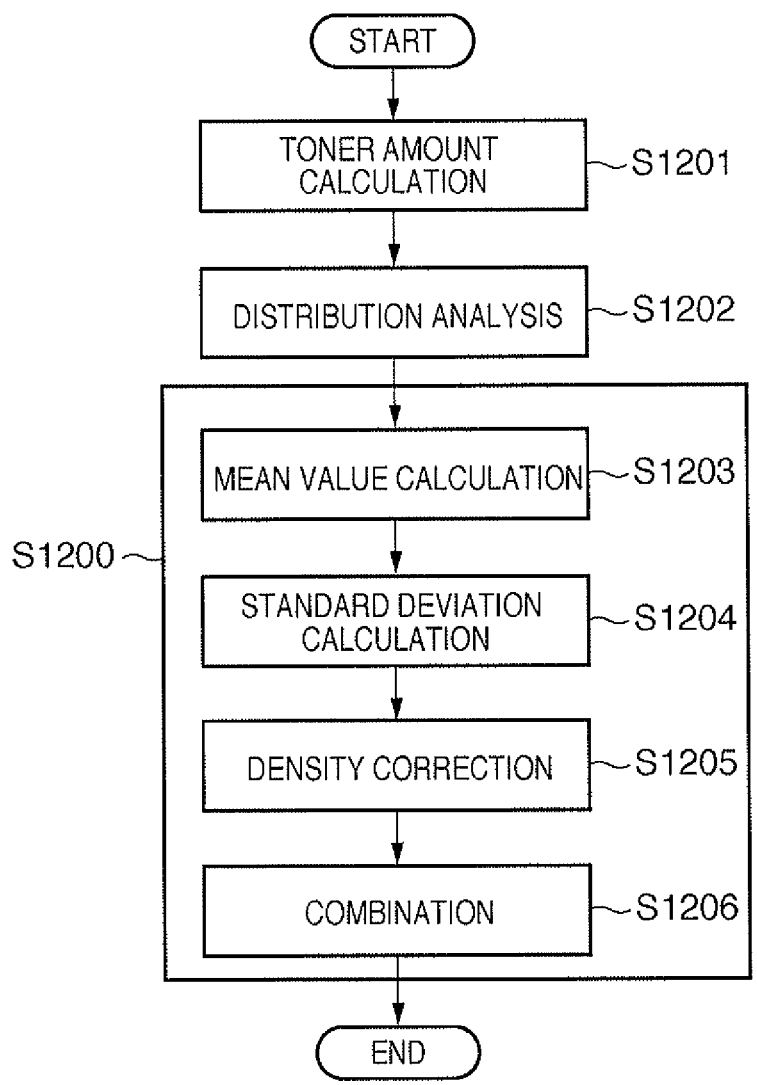
FIG. 12 is a flowchart pertaining to the third embodiment.

FIG. 8 shows a block diagram of the toner amount dynamic range correction section according to the present embodiment, and FIG. 12 shows a flowchart of processing in the toner amount dynamic range correction processing section. It should be noted that "toner amount dynamic range correction section" in FIG. 8 corresponds to the unit A205. Although there are cases where the functions of the toner amount dynamic range correction section are implemented by hardware, the functions may be achieved by a program. A conversion section 800 includes the mean value calculation section 403, the density correction section 404, a standard deviation calculation section 801, and a combination section 802. Similarly, step S1200 includes steps S1203, S1204, S1205, and S1206. Hereinafter, description is given with reference to FIG. 8 and FIG. 12 regarding operations of a toner amount dynamic range correction section according to the third embodiment.

The toner amount calculation section 401 in step S1201, the distribution analysis section 402 in step S1202, the mean value calculation section 403 in step S1203, and the density correction section 404 in step S1205 respectively carry out equivalent operations as the first embodiment, and therefore description thereof is omitted.

In step S1204, in the standard deviation calculation section 801, the toner amounts Vc(x,y) of the pixel (x,y) and the mean value $V_{AVG}$ of toner amounts in the overall image are used to calculate a standard deviation Vσ of toner amounts in the overall image. For example, a square of a difference between Vc(x,y) and $V_{AVG}$ is added for all the pixels and a square root of the sum is divided by the number of pixels, thereby giving a standard deviation Vσ of toner amounts. In a case where step S1203 is carried out before step S1202, step S1204 may be carried out after step S1203 or before step S1202. Also, step S1204 may be carried out after step S1205.

Figure 9:
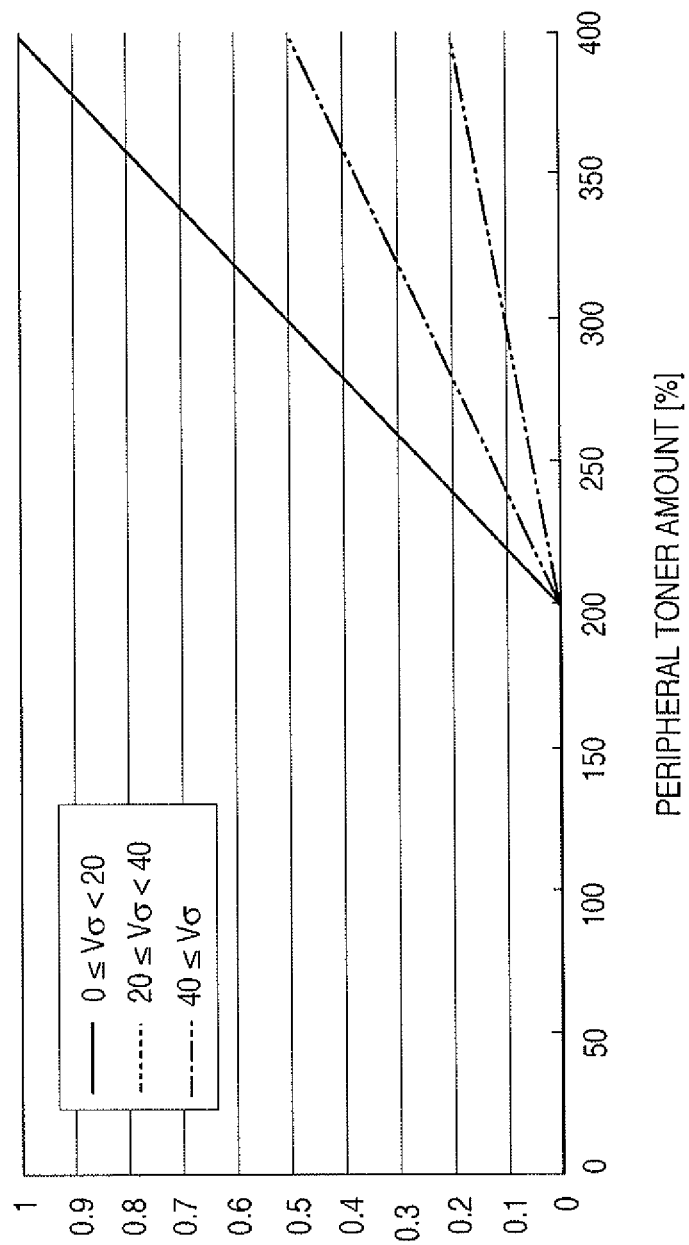
FIG. 9 is a diagram showing selection examples of conversion tables based on Vσ.

In step S1206, the combination section 802 first carries out a selection of a table based on the standard deviation Vσ. Following this, a combination ratio of the CMYK input signals of the pixels (x,y) and the toner amount dynamic range corrected C'M'Y'K' signals is determined using the selected table based on the peripheral toner amounts Vs(x,y) of the pixels (x,y), and combination is carried out based on the combination ratio that is determined. FIG. 9 shows selection examples of tables based on Vσ. FIG. 9 signifies that a table is selected so that a largest value of the combination ratio of correction signals becomes larger for smaller standard deviations Vσ of toner amounts in the overall image. Combination processing using the table that is determined involves equivalent processing content as step S1005 in the first embodiment, and therefore further description is omitted. Furthermore, instead of a table, a function or a coefficient of a function may be selected. Furthermore, the combination ratio may be offered to the user as a selectable mode for example, and this may be selected.

The C"M"Y"K" signals, which are the output of the combination section 802, become the output of the toner amount dynamic range correction section according to the present embodiment.

In this way, with the correction processing of the present embodiment, if colorant amount data of peripheral areas of a pixel of interest in original color image data exceeds a threshold value, the values of the color components of the pixel of interest are corrected by performing compression using a higher compression ratio for larger colorant amount data of peripheral areas of that pixel.

In an above-described manner, the same effect as the first embodiment can be obtained. Additionally, in a case where the peripheral toner amounts are equivalent, the combination ratio of the corrected image signals (namely the density range compressed image) is reduced for image data having larger toner amount standard deviations Vσ, thereby allowing contrast in the original image not to be lost even after dynamic range corrections.

Effect of the Present Embodiments

By carrying out processing according to the present embodiment as preprocessing of toner amount limiting, an overall intensity of toner amount dynamic range correction effects is controlled in response to characteristics of the image, and there is an effect that a more natural toner amount limited image is obtained. Additionally, there is an effect that characteristics of the original image tend not to be lost due to toner amount dynamic range corrections.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-289174, filed Nov. 11, 2008 which is hereby incorporated by reference herein in its entirety.

What is claimed is:

1. An image forming apparatus, comprising:
an obtainment unit configured to obtain a colorant amount for a target pixel in input color image data, wherein the colorant amount for the target pixel in the input color image data is the sum of respective color component values for the target pixel in the input color image data;
a unit configured to apply filtering processing to the input color image data and to obtain a colorant amount for the target pixel in image data which has undergone the filtering processing;
a correction unit configured to correct the colorant amount for the target pixel in the input color image data based on the colorant amount for the target pixel which has undergone the filtering processing; and
a combination unit configured to combine the colorant amount for the target pixel in the input color image data and the corrected colorant amount for the target pixel corrected by the correction unit based on a combination ratio determined in accordance with the colorant amount for the target pixel in the image data which has undergone the filtering processing,
wherein the correction unit corrects the colorant amount for the target pixel in the input color image data so that the colorant amount for the target pixel in the input color image data becomes smaller as the colorant amount for the target pixel which has undergone the filtering processing become larger, and
wherein the combination unit determines the combination ratio so that a ratio of the corrected colorant amount for the target pixel becomes larger as the colorant amount for the target pixel which has undergone the filtering processing becomes larger.

2. The image forming apparatus according to claim 1, wherein the correction unit carries out density correction by multiplying the colorant amount for the target pixel in the input color image data by a ratio of a mean value of colorant amounts for the input color image data to the colorant amount for the target pixel which has undergone the filtering processing.

3. The image forming apparatus according to claim 1, further comprising a processing unit configured to carry out a process of limiting a colorant amount for color image data combined by the combination unit.

4. The image forming apparatus according to claim 1, wherein the correction unit includes:
a correction coefficient adjustment unit configured to, in a case where a colorant amount for the target pixel in the input color image data exceeds a predetermined limit value, determine a density correction coefficient so that a correction amount becomes larger as the colorant amount for the target pixel in the input color image data becomes larger; and a density correction unit configured to correct a colorant amount for the target pixel in the input color image data by multiplying the colorant amount for the target pixel in the input color image data by the density correction coefficient.

5. The image forming apparatus according to claim 1, wherein the correction unit includes:
a density correction unit configured to correct a colorant amount for the target pixel in the input color image data so that the colorant amount for the target pixel in the input color image data becomes smaller as colorant amounts for the target pixel which has undergone the filtering processing become larger; and
a standard deviation calculation unit configured to calculate a standard deviation of colorant amounts for an overall image,
wherein the combination unit determines the combination ratio in accordance with the colorant amount for the target pixel which has undergone the filtering processing and the standard deviation.

6. The image forming apparatus according to claim 1, wherein the combination unit determines the combination ratio using a table or function that is held in advance.

7. The image forming apparatus according to claim 1, wherein the combination unit is further configured to receive from a user a selection of a table, a function or a mode for determining the combination ratio.

8. An image forming method, comprising:
using a processor to execute:
a step of obtaining a colorant amount for a target pixel in input color image data, wherein the colorant amount is the sum of respective color component values for the target pixel in the input color image data;
a step of applying filtering processing to the input color image data and obtaining a colorant amount for the target pixel in image data which has undergone the filtering processing;
a correction step of correcting the colorant amount for the target pixel in the input color image data based on the colorant amount for the target pixel which has undergone the filtering processing; and
a combination step of combining the colorant amount for the target pixel in the input color image data and the corrected colorant amount for the target pixel corrected in the correction step based on a combination ratio in accordance with the colorant amount for the target pixel in the image data which has undergone the filtering processing,
wherein the correction step corrects the colorant amount for the target pixel in the input color image data so that the colorant amount for the target pixel in the input color image data becomes smaller as the colorant amount for the target pixel which has undergone the filtering processing become larger, and
wherein the combination step determines the combination ratio so that a ratio of the corrected colorant amount for the target pixel becomes larger as the colorant amount for the target pixel which has undergone the filtering processing becomes larger.

9. A non-transitory computer-readable storage medium on which is stored a program for implementing an image forming method by being executed on a computer, the image forming method including:
a step of obtaining a colorant amount for a target pixel in input color image data, wherein the colorant amount is the sum of respective color component values for the target pixel in the input color image data;
a step of applying filtering processing to the input color image data and obtaining a colorant amount for the target pixel in image data which has undergone the filtering processing;
a correction step of correcting the colorant amount for the target pixel in the input color image data based on the colorant amount for the target pixel which has undergone the filtering processing; and
a combination step of combining the colorant amount for the target pixel in the input color image data and the corrected colorant amount for the target pixel corrected in the correction step based on a combination ratio in accordance with the colorant amount for the target pixel in the image data which has undergone the filtering processing,
wherein the correction step corrects the colorant amount for the target pixel in the input color image data so that the colorant amount for the target pixel in the input color image data becomes smaller as the colorant amount for the target pixel which has undergone the filtering processing become larger, and
wherein the combination step determines the combination ratio so that a ratio of the corrected colorant amount for the target pixel becomes larger as the colorant amount for the target pixel which has undergone the filtering processing becomes larger.

* * * * *